Patented July 22, 1952

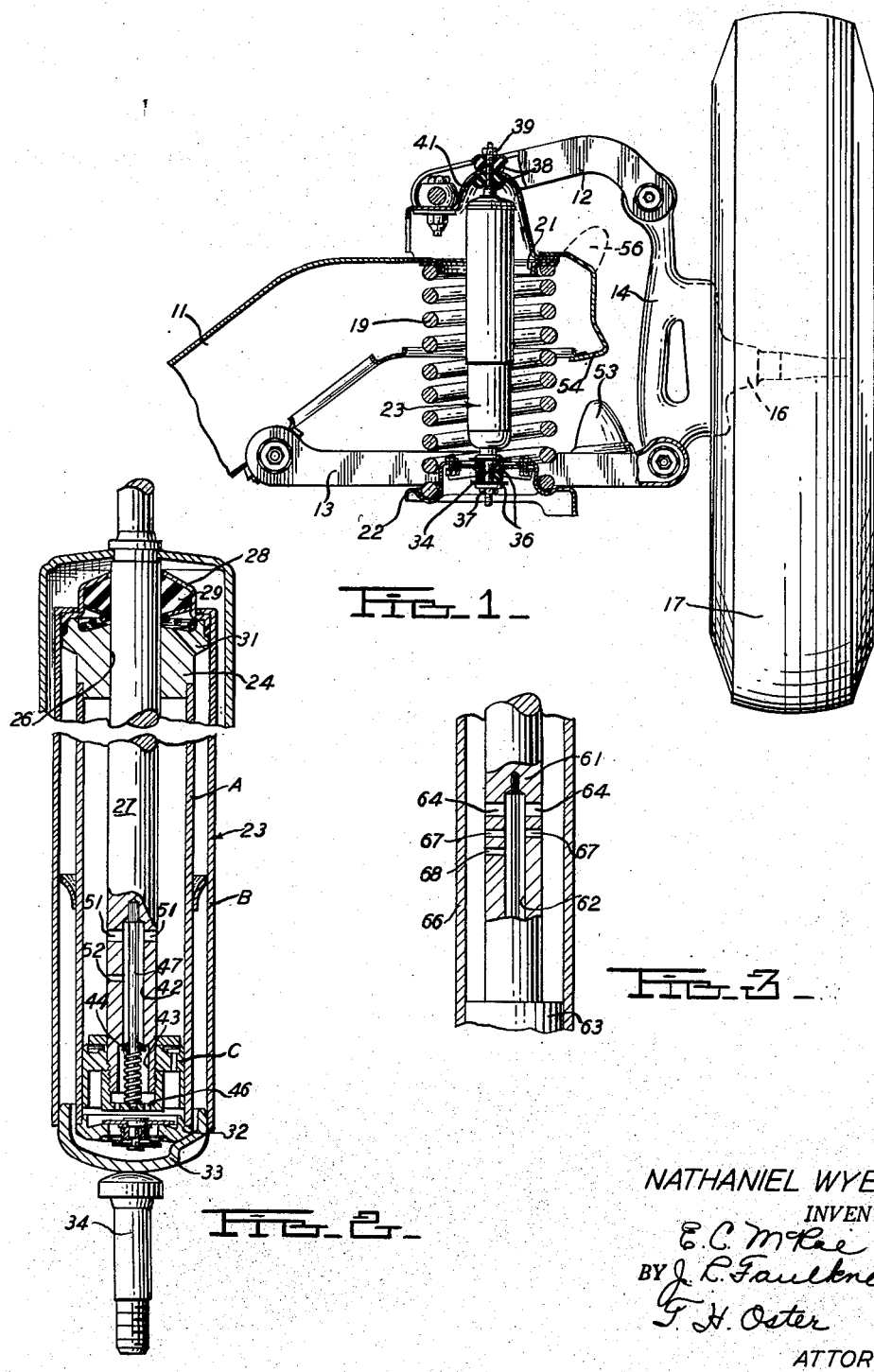

2,604,193

UNITED STATES PATENT OFFICE 2,604,193

SHOCK ABSORBER

Nathaniel Wyeth, Dearborn, Mich., assignor to Ford Motor Company, Dearborn, Mich., a corporation of Delaware Application March 3, 1950, Serial No. 147,415

1 Claim. (Cl. 188—88)

This invention relates generally to hydraulic shock absorbers and refers more particularly to improvements in direct acting shock absorbers for motor vehicles.

An object of the present invention is to provide a hydraulic shock absorber adapted to be connected between sprung and unsprung parts of a motor vehicle and arranged to effectively prevent excessive relative movement between these parts. This is accomplished by providing a hydraulic cut-off arranged to automatically close communication through a valved piston at a predetermined point in the stroke of the piston and to trap a quantity of oil in the shock absorber to form a fluid buffer against further relative movement between the shock absorber parts and between the sprung and unsprung parts of the vehicle.

A further object of the invention is to provide a hydraulic shock absorber having a multiple stage cutoff system arranged to progressively decrease and finally completely cut off the flow of oil through the valved shock absorber piston. This construction enables the cutoff to be effected gradually to minimize the shock load and to provide a controlled dampening of the relative movement between the sprung and unsprung parts of the vehicle.

Still another object of the invention is to provide a shock absorber capable of attaining the objects mentioned above without materially increasing the cost thereof. A conventional shock absorber can be readily modified in accordance with the present invention without the addition of extra parts, and inasmuch as a rubber bumper conventionally used in vehicle suspensions may be eliminated, a net saving in overall cost may result.

Other objects and advantages of this invention will be made more apparent as this description proceeds, especially when considered in connection with the accompanying drawing, wherein:

Figure 1 is a transverse cross sectional view through the independent front wheel suspension of a motor vehicle incorporating the present invention.

Figure 2 is an enlarged cross sectional view of the shock absorber shown in Figure 1.

Figure 3 is a fragmentary cross sectional view of a modification.

Referring now to the drawing, and particularly to Figure 1, there is shown a conventional independent front wheel suspension for a motor vehicle. The reference character 11 indicates a transverse cross frame member pivotally supporting an upper suspension arm 12 and a lower suspension arm 13. The upper and lower ends of a spindle support 14 are pivotally connected to the outer ends of the upper and lower suspension arms respectively. A wheel spindle 16 rotatably supports a vehicle wheel 17. A compression coil spring 19 is mounted between a spring seat 21 provided on the frame cross member 11 and a spring pan 22 carried by the lower suspension arm 13. 23 is a tubular direct acting shock absorber also connected between the cross frame member 11 and the spring pan 22. As best seen in Figure 2, A is the pressure cylinder, B the reserve chamber, and C the piston assembly of the shock absorber 11.

The pressure cylinder A is tubular in form and is provided at its upper end with a guide bushing 24 forming a closure member for the cylinder. The guide bushing 24 has a central bore 26 for slideably receiving the piston rod 27 which in turn carries at its lower end the piston C.

Reserve cylinder B is likewise tubular in form and encircles the pressure cylinder A, providing a chamber therebetween for reserve fluid. At its upper end the reserve cylinder B is supported upon the guide bushing 24. A cap 28 is mounted at the upper end of the reserve cylinder B and houses a sealing member 29 arranged to prevent leakage adjacent the piston rod 27. A passage 31 is provided in the guide bushing 24 so that liquid which may leak past the bushing will be returned to the reserve chamber.

At their lower ends the pressure cylinder A and reserve cylinder B are joined by interconnected closure members 32 and 33, the latter being welded to the upper end of a short rod 34. As best seen in Figure 1, the rod 34 is attached to the spring pan 22 by means of rubber grommets 36 and a threaded nut 37. The pressure cylinder A is thus attached to the lower suspension arm and hence to the unsprung portion of the wheel suspension.

The upper end of the piston rod 27 extends beyond the upper end of the cylinders A and B and is attached by means of grommets 38 and a nut 39 to a bracket 41 fixedly mounted upon the cross frame member 11. The piston rod and the pistons carried thereby are thus connected to a sprung portion of the vehicle chassis.

The end of the piston rod 27 adjacent the piston assembly C is formed with a central bore 42 communicating with an enlarged chamber 43 directly therebeneath through a spring loaded valve 44. The chamber 43 is in communication with the portion of the pressure cylinder A beneath the piston assembly C through apertures 46, and it will be seen that the valve 44 thus controls the transfer of fluid between opposite sides of the piston assembly C. The valve 44 is slideably mounted upon a stem 47 extending centrally through the bore 42 and anchored at its upper end in the piston rod 27. An annular chamber is thus formed in the bore 42 surrounding the stem 47.

In conventional shock absorbers a radial port is formed in the piston rod 27 immediately adjacent the upper surface of the piston C to establish communication between the central bore and the pressure cylinder, the port being located in this position to enable the mechanism to function as a shock absorber throughout the greatest possible travel of the piston in the cylinder. In the present construction, the port immediately adjacent the piston is omitted, the bore 42 is extended upwardly in the piston rod a greater distance, and radial ports 51 and 52 are provided to establish communication between the central bore 42 and the pressure cylinder A at points remote from the piston assembly C.

In the form of the invention shown in Figure 2 I have provided a pair of axially aligned ports 51 extending through the piston rod 27 adjacent the upper end of the bore 42. Intermediate the ports 51 and the upper end of the piston assembly C I have provided a second and somewhat smaller radially extending port 52. It will be apparent that the aligned ports 51 provide communication between the upper end of the cyclindrical bore 42 and the interior of the pressure cylinder A and permit a substantial flow of fluid therebetween. The single port 52, being somewhat smaller in diameter, forms a restricted communication between the bore 42 and the interior of the pressure cylinder A. The total flow of fluid provided by the ports 51 and 52 is adequate for normal shock absorber operation in the usual manner.

During operation of the vehicle, rising and falling movement of the front road wheel 17 results in reciprocatory movement of the piston assembly C within the pressure chamber A of the shock absorber. During normal operation with the amplitude of rising and falling movement of the road wheel being within the usual limits, the bounce and rebound strokes are subject to the usual control by the shock absorber, the ports 51 and 52 being open to the interior of the pressure cylinder A. Unusual conditions, however, such as large chuck holes and bumps, may result in abnormally large movement of the road wheel relative to the vehicle frame, and under some circumstances might result in damage to the wheel suspension. To cushion this abnormal movement it is customary to provide rubber bumpers. As seen in Figure 1, a lower rubber bumper 53 is mounted upon the lower suspension arm 13 in position to contact the bracket 54 carried by the front cross frame member 11 should the bounce stroke of the wheel suspension exceed safe limits. With the usual construction, an upper rubber bumper, shown in phantom in Figure 1 and designated by the reference character 56, is carried on the bracket 54 at the outboard end of the front cross frame member 11 in position to be contacted by the upper suspension arm 12 should the rebound stroke be excessive. With the present invention it is possible to eliminate this upper rubber bumper since the shock absorber itself provides the necessary cushion and safety check to prevent damage to the wheel suspension system should the rebound stroke be abnormally large.

During the rebound stroke, or when the vehicle wheel falls due to a chuck hole or the like, the piston assembly C is raised in the pressure cylinder A. Under normal operating conditions, the upper limit of the travel of the radial ports 51 is somewhat below the bottom of the guide bushing 24 at the top of the pressure cylinder A. When the stroke exceeds the normal limits, however, the upward movement of the piston rod 27 and piston assembly C relative to the pressure cylinder A is such that the upper ports 51 are covered by the guide bushing 24, thus cutting off communication between the pressure cylinder A and the interior of the bore 42 through the ports 51. Under these circumstances, the only communication between the pressure cylinder and the bore is through the single restricted port 52, and this restriction cushions the travel of the piston in the cylinder. This may be sufficient to check further movement of the piston in the cylinder and bring the rebound stroke to a halt, but if the movement continues it will be seen that the restricted port 52 will be covered by the guide bushing 24 as well. When this occurs, all communication is cut off between the interior of the pressure cylinder A and the interior of the bore 42. Fluid is now trapped in the bottom of the pressure cylinder A between the guide bushing 24 and the piston C forming, except for possibly a small amount of leakage, a fluid block. The rebound stroke is thus checked and damage to the suspension system is obviated.

It has been found that the conventional shock absorber is sufficiently strong to operate in the above manner and can be readily modified with a minimum of cost. The ports 51 and 52 can be formed by simple drilling operations and the slight additional cost of the shock absorber is overweighed by the possibility of eliminating the upper rubber bumper.

Although I have shown a construction comprising a pair of aligned ports 51 and a single smaller port beneath the pair of ports, other arrangements are possible and are within the contemplation of the present invention. For example, a single port of sufficient size, located at a point remote from the top of the piston assembly, will provide a fluid cutoff and check the rebound movement, but will not have the cushioning effect of the multiple port arrangement shown. Another possible arrangement is shown in the modification of Figure 3 in which the piston rod 61 is formed with a cylindrical bore 62 extending upwardly within the piston rod a substantial distance above the top of the piston 63. In the upper end of the bore 62 a pair of aligned radial ports 64 are provided to establish communication between the bore 62 and the interior of the pressure cylinder 66. Spaced beneath the ports 64 are a pair of aligned radial ports 67 somewhat smaller in diameter than the ports 64, and spaced a predetermined distance between the ports 67 is a single radial port 68 of relatively small size. It will be apparent that this construction provides a multiple stage cutoff effective to cushion abnormal rebound movement in stages. The upper ports 64 are first covered by the closure member (not shown) at the upper end of the pressure cylinder 66, restricting the flow to the ports 67 and 68. Further movement causes the ports 67 to be covered by the closure member further restricting the flow to the single port 68, and still further movement covers the port 68 forming a complete fluid cutoff. It will be apparent that other combinations are available and that the number, location and size of the ports establishing communication between the pressure cylinder and the central bore, can be varied to provide the desired effect. It is likewise within the scope of my invention to provide a fluid cutoff and multiple stage fluid cushion for the bounce stroke as well.

It will be understood that the invention is not to be limited to the exact construction shown and described, but that various changes and modifications may be made without departing from the spirit and scope of the invention, as defined in the appended claim.

What is claimed is:

A direct acting hydraulic shock absorber for a motor vehicle adapted to be mounted between sprung and unsprung parts of the vehicle, comprising a pressure cylinder attached to one of said parts, a piston reciprocable in said cylinder and attached to the other of said parts, a closure member for one end of said cylinder formed with a cylindrical opening through which said piston rod extends, said piston and piston rod having an axial passageway formed therein extending completely through said piston and into said piston rod a substantial distance beyond said piston, a valve stem of smaller diameter than the diameter of said passageway extending concentrically through said passageway and having one end fixed in said piston and its opposite end fixed in said piston rod adjacent the end of said passageway, said passageway being enlarged intermediate its length to form a valve seat, a valve slidably mounted upon said valve stem and adapted to engage said valve seat to close communication between said passageway and said pressure cylinder on the side of said piston remote from said piston rod, a spring surrounding said valve stem and engaging said valve to yieldably hold the latter against said valve seat, and a plurality of axially spaced ports in said piston rod establishing communication between said passageway and said pressure cylinder, one of said ports being adjacent the end of said passageway in said piston rod and in position to be covered by said closure member after predetermined relative movement between said sprung and unsprung parts of the vehicle to restrict the flow of fluid between said passageway and pressure cylinder to the cross sectional area of the other ports to cushion further relative movement, said other ports being located between said first mentioned port and said piston in position to be successively covered by said closure member upon further relative movement to trap a body of fluid in said pressure cylinder.

NATHANIEL WYETH.

REFERENCES CITED

The following references are of record in the file of this patent:

UNITED STATES PATENTS

| Number | Name | Date |
|---|---|---|
| 1,365,030 | Flentje | Jan. 11, 1921 |
| 2,182,016 | Deutsch | Dec. 5, 1939 |
| 2,321,832 | Leighton | June 15, 1943 |